Oct. 3, 1939.  I. M. TERWILLIGER  2,174,766
MEANS FOR PRODUCING STEREOSCOPIC PHOTOGRAPHIC EFFECTS
Original Filed Dec. 12, 1932   2 Sheets-Sheet 1

Inventor
Ivan Melville Terwilliger
By Lyon & Lyon
Attorneys

Oct. 3, 1939.   I. M. TERWILLIGER   2,174,766
MEANS FOR PRODUCING STEREOSCOPIC PHOTOGRAPHIC EFFECTS
Original Filed Dec. 12, 1932   2 Sheets-Sheet 2
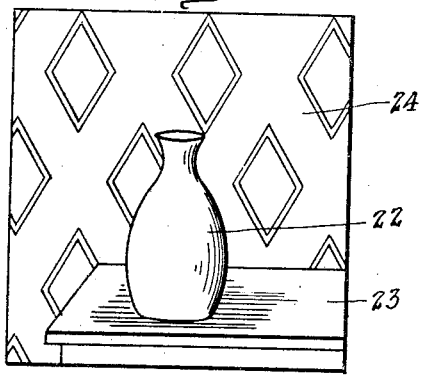
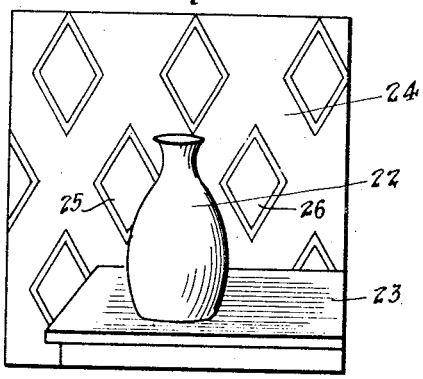
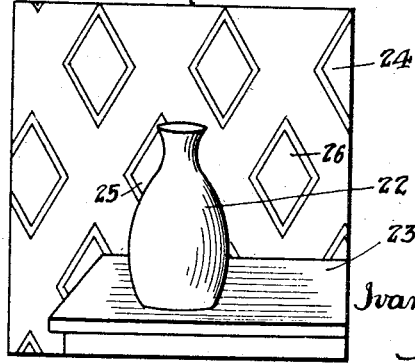
Inventor
Ivan Melville Terwilliger
By Lyon & Lyon
Attorneys Patented Oct. 3, 1939

2,174,766

UNITED STATES PATENT OFFICE 2,174,766

MEANS FOR PRODUCING STEREOSCOPIC PHOTOGRAPHIC EFFECTS

Ivan Melville Terwilliger, Altadena, Calif.

Application December 12, 1932, Serial No. 646,749
Renewed April 15, 1938

2 Claims. (Cl. 88—16.6)

My invention relates to stereoscopic photography, and has particular reference to apparatus for producing stereoscopic effects by employing a single camera and a single aperture for the purpose of producing the photographs.

In my copending applications, Serial No. 492,713, filed November 1, 1930, and Serial No. 612,897, filed May 23, 1932, now Patent No. 2,104,779, I have disclosed a method of producing stereoscopic effects in which the camera was moved along its optical axis for the purpose of producing photographs taken from two apparent points of view to thereby produce a photograph, or succession of photographs having a different aspect relation between the foreground objects and the background objects, thereby producing a vision of a part of the background behind and around the foreground objects, making the foreground objects stand out with an apparent depth.

It is an object of the present invention to produce a method of stereoscopic photography in which the same fundamental principles are involved as those disclosed in my copending applications, but in which it is unnecessary to actually move the camera in order to produce the photographs from different aspects.

Another object of the invention is to provide a camera provided with a device for producing stereoscopic effects in which means are inserted between the lens of the camera and the objects to be photographed, which will shift the apparent position of the objects and produce photographs showing different aspects of the background objects relative to the foreground objects.

Another object of the invention is to provide a camera of the type set forth in the preceding paragraph in which the amount of apparent shifting of the relation between the background and foreground objects may be increased or decreased.

Another object of the invention is to provide a camera, as set forth in the preceding paragraphs, in which a refracting device is inserted between the lens of the camera and the objects to be photographed, the refracting member having parallel faces.

Other objects and advantages will be apparent from a study of the following specification, read in connection with the accompanying drawings, wherein Figure 1 is a top plan view of a camera equipped with a stereoscopic device in accordance with my invention;

Figures 4, 5 and 6 are diagrammatical views representing three photographs produced in accordance with my invention; Figure 4 representing the photograph produced without the refracting members or member inserted between the lens and the object; Figure 5 representing the photograph obtained when one of the refracting members is inserted between the camera and the object; and Figure 6 representing the photograph obtained when the other refracting member is employed between the object and the camera.

Figure 1:
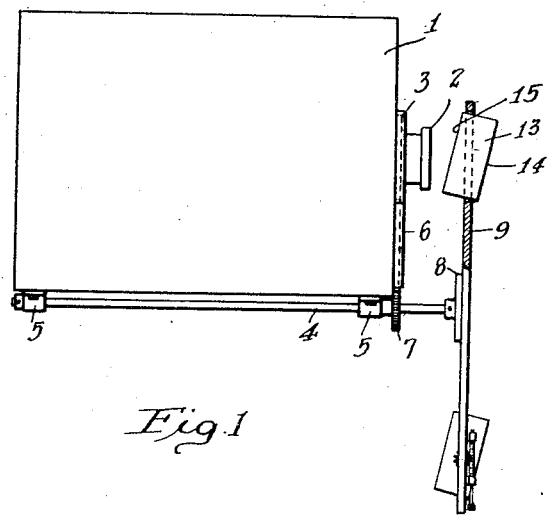

Referring to the drawings, I have illustrated in Figure 1 a camera I indicated merely as a box type camera, having a lens 2 and shutter mechanism illustrated diagrammatically at 3. To one side of the camera, I have illustrated a rotatable shaft 4, preferably mounted in bearings 5 secured to the side of the camera so that the shaft may be rotated with respect to the camera and preferably with the axis of rotation parallel with the optical axis of the lens 2.

As will be hereinafter set forth, the rotation of the shaft 4 is to be coordinated with the operation of the shutter 3 and for this purpose, I have illustrated the shutter 3 as being connected through a gear train 6 to a driving gear 7 secured to the shaft 4.

Upon the outer end of the shaft 4, I have illustrated a flange 8, to which is secured a disc 9 having a diameter sufficient to cause the periphery of the disc to overlap the plane of the lens 2. At spaced points about the disc 9, I have illustrated openings 10, 11 and 12, three of such openings being illustrated herein, though it will be understood that any number of openings may be provided. The opening 10 is illustrated as having mounted therein a refracting member 13 which is preferably formed from a relatively thick section of optical glass, having any desired configuration, provided the front face 14 thereof and the rear face 15 thereof are parallel to each other so that substantially all rays of light striking upon the front face 14 will be refracted substantially the same amount and will leave the rear surface of the lens 15 in a path substantially parallel with the path of the ray of light striking the front face 14. The refractor 13 is illustrated herein as comprising a flat plate of glass, having a rectangular configuration. In other words, the refracting member 15 should not converge the rays of light striking thereon, but should pass the rays of light through the refracting member with the sole effect being to shift the rays of light with respect to their initial path.

The refracting member 13 may be mounted with its front and rear faces parallel with the plane of the lens 2 and then with such mounting there will be a substantial shifting of the position of the rays of light as they pass through the refracting member 15. However, I prefer to mount the refracting member 13 with its faces at a considerable angle with respect to the plane of the lens to increase the amount of the lateral shifting of the rays of light in order to produce a more pronounced stereoscopic effect.

Figures 2, 3:
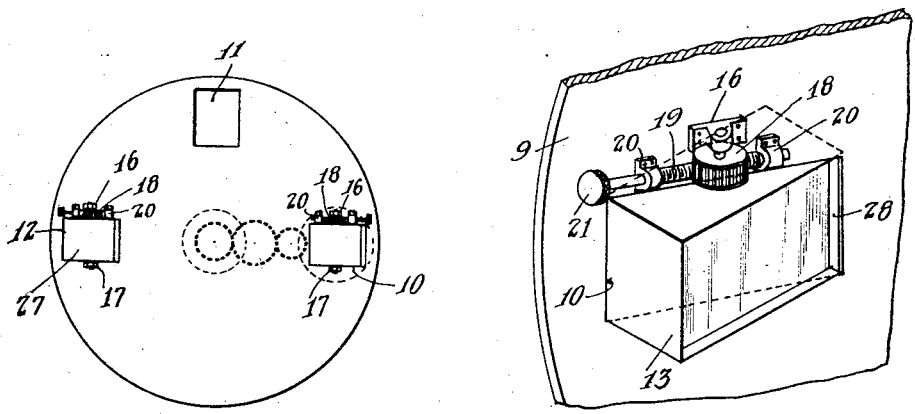
Figure 2 is a front elevational view of the disc and refracting members employed in connection with the camera illustrated in Figure 1.
Figure 3 is a perspective view of the section of the disc and one of the refracting members illustrating the manner in which the refracting member may be mounted and adjusted.

By referring particularly to Figure 3, it will be observed that the refracting member 13 is preferably mounted in the opening 10 upon suitable bearings 16 and 17, so that the refracting member may be adjusted to present its front and rear faces at varying angles with the plane of the lens. In order to hold the refracting member in any of its adjusted positions, a suitable adjusting device may be employed, the one illustrated herein including a worm gear 18 mounted upon the bearing which supports the refracting member, which worm gear is driven by a worm or screw 19 suitably mounted in bearings 20 having upon one end thereof a thumb-nut 21 permitting ready rotation of the screw. Thus by adjusting the position of the screw 19 the lens may be positioned at any desired angle.

Referring again particularly to Figure 2, it will be observed that the opening 11 is blank; that is, it has no refracting member therein so that when this opening is presented in front of the lens 2, the rays of light emanating from the object of the photograph will pass directly into the lens without any lateral shifting of such rays.

By properly coordinating the operation of the shutter 3 with the rotation of the disc 9 it will be apparent that at one position at which the shutter opens the blank opening 11 will be presented to the lens and a normal photograph of the object will be made. However, upon the next operation of the shutter 3, to produce a photograph, the refracting member 13 will be positioned immediately in advance of the lens 2 and thus the second or next photograph to be obtained will have the rays of light from the object shifted laterally with respect to the normal path of such rays.

By referring particularly to Figures 4 and 5, the effect of such photography will be clearly apparent.

In Figure 4 is represented diagrammatically a photograph which will be produced when the blank opening 11 is presented in front of the lens 2.

In Figure 4 I have illustrated a vase 22, set upon a table 23 in the foreground, while a wall 24, formed with a suitable design, constitutes the background considerably separated from the foreground objects.

In Figure 5 is represented the result of the photographing of the same object with the same position of the camera, but with the refracting member 13 interposed between the lens and the object.

By referring particularly to Figure 5, it will be observed that the vase 22 is in substantially the same relative position as in Figure 4. However, the extreme left-hand edge of the table 23 appears to have been shifted laterally to the right.

At the same time, the background 24 appears to have been shifted laterally to the left. That is, there has been a considerable lateral shifting between the apparent positions of the foreground objects and the background. This is particularly noted by referring to a portion of the design indicated by the reference character 25 which, in Figure 4, was duly obscured by the vase 22 which in Figure 5 has been exposed to a considerably greater degree. It will also be apparent by referring to that portion of the design indicated by the reference character 26, the left-hand corner of which, in Figure 4, was in substantial alignment with the outermost line of the vase on the right-hand side, has now in Figure 5 been shifted to an apparent position with the point considerably to the left of its original position.

Those photographs which are produced by first photographing the object without the refracting member, and then again photographed with the refracting member before the lens, produces an apparent shifting of the objects to expose different portions of the background in the different exposures. Thus when these photographs so taken are combined either by projecting the same in rapid succession or by printing the same upon the positives, the appearance so obtained will be that the edges of the foreground objects will appear to be rounded and will further appear to permit vision behind the edges of the objects to show portions of the background which are in fact directly behind the foreground objects. Thus an appearance of depth is produced which is in effect a stereoscopic effect. The disc mounting on the refracting member is but one of the many ways in which the refracting member may be readily placed into position in front of the camera and one of the many ways in which the interposition of the refracting member may be coordinated with the operation of the camera shutter.

While the employment of but a single refracting member interposed between the lens of the camera in alternation with the removal of the refracting member when successive photographs are taken produces a pleasing stereoscopic effect, this effect may be further enhanced by employing the two refracting members illustrated in Figures 1 and 2. A second refracting member 27 may be a substantial duplicate of the refracting member 13, but is preferably mounted upon the disc with the angle of its disposition relative to the plane of the lens opposite to the angle with which the refracting member 13 is positioned. Thus as the disc is rotated and successive photographs are made first with the refracting member 13 in front of the lens, then with the blank opening 11 in front of the lens, and, finally, with the refracting member 27 in front of the lens, three different types of photographs will be produced, the third type being represented in Figure 6, in which it will be observed that instead of the sections of the design of the background being shifted laterally to the left, they are, in this instance, shifted laterally to the right and thus a double effect is produced, exposing additional portions of the background upon the right-hand side of the foreground objects.

The particular refracting member which I desire to employ is preferably a section of optical glass which, as hereinbefore stated, should have its front and rear faces parallel with each other, but must have the side surfaces of the glass so treated as to prevent reflections therefrom.

By referring particularly to Figure 3, it will be observed that the refractor 13 is mounted within a masking frame 28 which is preferably blackened, or otherwise treated to be light absorbent instead of light reflective, and I find that it is further desirable to roughen or etch the side surfaces of the refractor to further diffuse inadvertent light which may strike upon them and thus prevent reflections.

It should be noted that there will normally be a difference in the intensity of the images produced first with the refractor interposed and then without the refractor interposed, due to the diminution of the light passing through the material of the refractor. This produces a rather desirable effect, since it produces a distinct image without the refractor and a less intense image when the refractor is in place, producing the stereoscopic effect without diminution of the picture by the stereoscopic features.

It is also apparent that the disc which is employed for the purpose of mounting the refractors may also be employed as the shutter for the camera, if it is not desired to use a separate shutter, the only essential modification required being to enclose the entire structure in a proper lightproof housing.

While the images produced may be produced upon separate sections of the negative film, it is also possible to produce pleasing stereoscopic effects by a double exposure method, in which the same section of film will have first one image exposed thereon without the refractor, and then another image with the refractor, or vice-versa, so that the single negative film frame may have impressed both types of images.

It will be observed that with the construction set forth, it is possible to produce photographic effects in which an appearance of depth is produced, and the amount of stereoscopic effect may be varied within considerably wide limits.

While I have shown and described the preferred embodiment of my invention, I do not desire to be limited to any of the details of construction shown or described herein, except as defined in the appended claims.

I claim:

1. A camera having a means for supporting a photo-sensitive surface, a lens for focusing a scene to be photographed upon said surface, and a shutter for admitting light to said surface in combination with a refractor having front and rear faces plane and parallel to each other, means for movably supporting said refractor for movement between a position in front of said lens with said faces at a horizontal angle with respect to the plane of said lens, and a position clear of the field of said lens, and means for moving said refractor from one of said positions to the other and for actuating said shutter in each position, whereby said sensitive surface may be twice exposed to said scene, once through said lens alone and once through said lens and refractor.

2. A camera having a means for supporting a photo-sensitive surface, a lens for focusing a scene to be photographed upon said surface, and a shutter for admitting light through said lens to said surface in combination with a pair of refractors each having front and rear faces plane and parallel to each other, means for movably supporting one of said refractors for movement between a position in front of said lens with its faces at a transverse angle with respect to the optical axis of said lens and a position clear of said lens, means for supporting the other of said refractors for movement between a position in front of said lens with its faces at a transverse angle with respect to the plane of said lens but different with respect to said first refractor and a position clear of said lens, and means for actuating said shutter once while each refractor is positioned in front of the lens and once while both refractors are clear of the field of said lens, whereby three complementary exposures may be made of the scene, once through said lens alone and once through each of said diversely directed refractors.

IVAN MELVILLE TERWILLIGER.